United States Patent [19]

Wheeler et al.

[11] Patent Number: 4,702,687
[45] Date of Patent: Oct. 27, 1987

[54] FOOD FORMING DEVICE

[75] Inventors: Gilbert A. Wheeler, Moneta; Gregg A. Church; Charles L. Tucker, both of Bedford; William R. Ward, Vinton, all of Va.

[73] Assignee: McCormick & Company, Inc., Hunt Valley, Md.

[21] Appl. No.: 726,270

[22] Filed: Apr. 23, 1985

[51] Int. Cl.$^4$ .............................................. A21C 11/00
[52] U.S. Cl. .................................... 425/227; 425/288; 426/499
[58] Field of Search ................. 425/215, 94, 287, 288, 425/298, 202, 106, 227, 232; 222/571; 99/516; 426/516, 499, 514

[56] References Cited

U.S. PATENT DOCUMENTS

| Re. 25,536 | 3/1964 | Thompson | 425/364 R |
|---|---|---|---|
| 1,793,207 | 2/1931 | Bergner | 425/287 |
| 1,866,061 | 7/1932 | Schoel | 425/190 |
| 2,184,825 | 12/1939 | Wackler | 425/288 |
| 2,246,759 | 6/1941 | Roth et al. | 426/503 |
| 2,813,030 | 11/1957 | Rivoche | 426/276 |
| 2,909,449 | 6/1933 | Belshaw | 428/327 |
| 2,953,106 | 9/1960 | Jacobs | 425/96 |
| 3,452,687 | 7/1969 | Kaneko et al. | 425/116 |
| 3,650,766 | 3/1972 | Smadar | 426/89 |
| 3,832,116 | 8/1974 | Delorme | 436/74 |
| 3,872,786 | 3/1975 | Holton | 100/218 |
| 3,979,172 | 9/1976 | Sogo et al. | 425/109 |
| 4,233,016 | 11/1980 | Chin et al. | 425/287 |
| 4,514,159 | 4/1985 | Mägerle | 425/288 |

OTHER PUBLICATIONS

Perry and Chilton, *Chemical Engineers' Handbook*, 5th edition, 1973, pp. 5-47 to 5-49.

Primary Examiner—Jay H. Woo
Assistant Examiner—J. Fortenberry
Attorney, Agent, or Firm—Cushman, Darby & Cushman

[57] ABSTRACT

A food product forming device is provided with a dispensing nozzle through which the food product, in slurry form, is continually fed to the outlet end thereof where a sleeve including a cut off sleeve and an outer forming tube are mounted about the exterior of the nozzle so as to be movable towards and away from the dispensing end of the nozzle; the sleeve is provided with passages for receiving and distributing a discharging fluid to the food engaging portion of the sleeve to assist in discharging the food product from the lower end thereof.

6 Claims, 4 Drawing Figures

FOOD FORMING DEVICE

BACKGROUND AND SUMMARY OF THE INVENTION

The present invention relates to a dispensing nozzle in a food product forming apparatus and, more particularly, to a dispensing nozzle having a fluid pressure assisted discharge and cleaning means.

In the past, a number of automatic, relatively high speed food product forming devices, such as doughnut machines, cookie machines or the like, have been proposed where a slurry of the food product is delivered through a nozzle where the nozzle forms the product or delivers material to a forming station prior to treatment of the formed food product such as by cooking, freezing or the like.

Representative prior art in this field includes U.S. Pat. Nos. 1,793,207, 1,909,449, 2,184,825, 3,650,765, 3,650,766, 3,814,560, 3,979,172, and 4,233,016.

In a number of arrangements, gravity flow of the food material slurry has been relied upon to effect discharge of a formed product from the food forming apparatus. However, where the consistency of the formulation of the slurry varies, reliance upon gravity flow can often lead to significant down time when the machines have become clogged or where it has been necessary to start up the machine after a prolonged down time such as a weekend or holiday. With specific food recipes, production speeds have been relatively slow due, in part, to the necessity of frequently stopping the apparatus to effect cleaning of the product forming implements. Also, with a number of the specific types of food slurrys such as, for example, doughnut dough and onion ring slurrys, it has been the practice to assist discharge of the formed product from the forming implements by coating the slurry while or immediately after it is formed with a chemical composition that improves its lubricity. However, very often the use of such chemical compositions adversely effects the taste or other properties of the product in addition to the disadvantage of increasing the cost of the product. In other arrangements, it has been the practice to effect or assist discharge of the formed food product from the forming implements by sharply tapping the forming implement on a surface in an attempt to jar loose the formed food product. Such a procedure, while normally effective, can greatly shorten the useful life of an apparatus, on the one hand, or, on the other, require expensive and frequent maintenance due to the force to which the various linkages are subjected.

The present invention avoids the foregoing disadvantages by providing a fluid pressure assist to a food forming slurry delivery nozzle which is relatively inexpensive to operate and yet which will positively deliver the formed product from the nozzle for subsequent processing as well as clear the forming member of any undesirable food residue.

In summary, the present invention provides a sleeve about the exterior of a slurry delivery nozzle with the sleeve being provided with a recess which is in communication with a fluid pressure distribution chamber by means of a large number of small diameter bores. The fluid distribution chamber is connected to a source of fluid such as air or a suitable liquid maintained under pressure and connected to the fluid distribution chamber through a suitable control valve.

In operation, upon delivery of a quantity of slurry to the forming portion of the sleeve and nozzle, the valve will be actuated to deliver fluid under pressure to the bores to discharge the formed food product from the end of the nozzle and sleeve for further processing. The amount of pressure employed may vary to compensate for the degree of adhesion of the product to the adjacent surfaces of the nozzle and sleeve.

The foregoing and other advantages will become apparent as consideration is given to the following detailed description taken in conjunction with the accompanying drawings, in which:

DETAILED DESCRIPTION OF THE INVENTION

Figure 1:
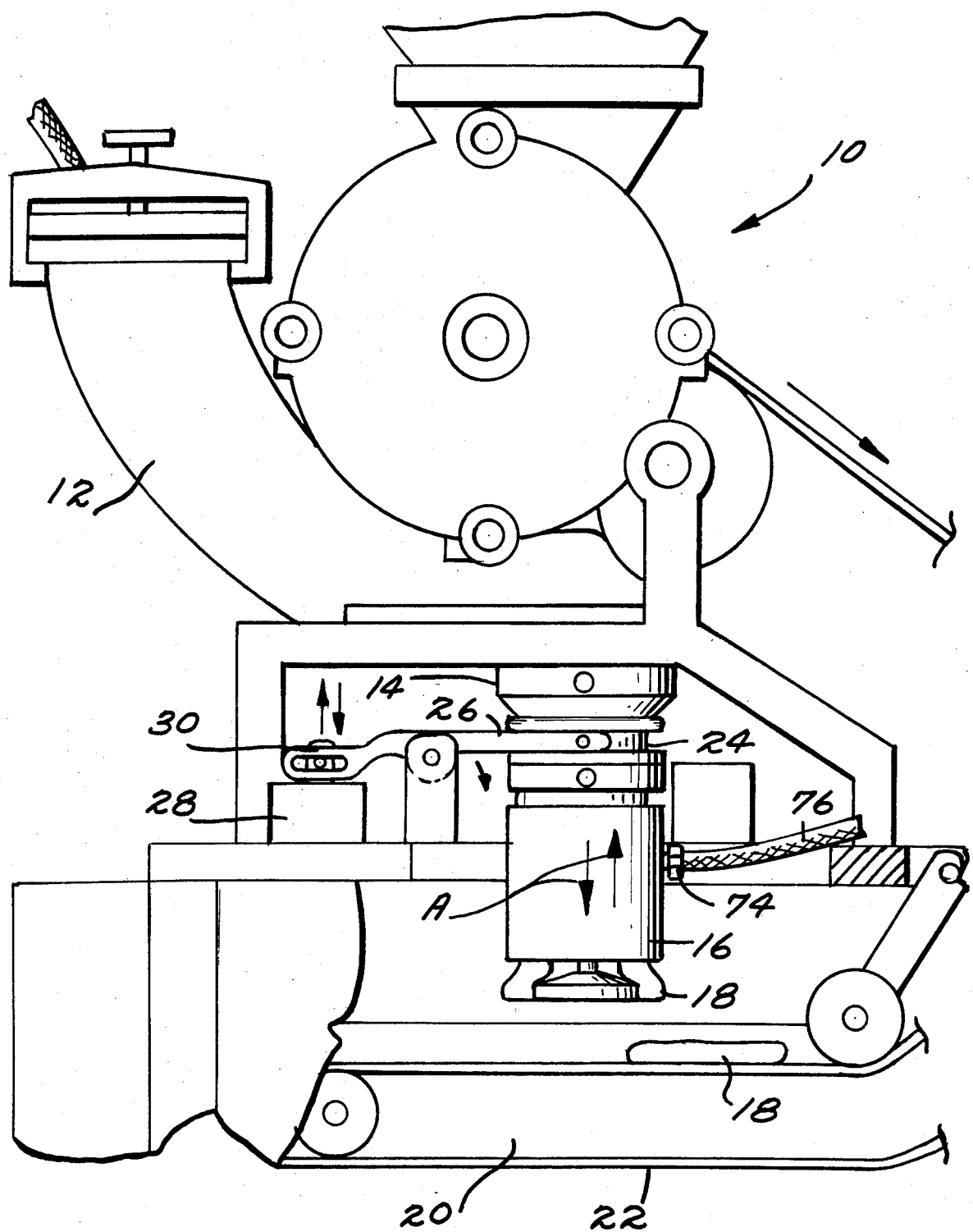
FIG. 1 is a side view in elevation with parts broken away of a food forming apparatus using the food forming device of the present invention.

Referring now to the drawings wherein like numerals designate corresponding parts throughout the several views, there is shown in FIG. 1, a food forming apparatus 10 which includes a slurry feeder 12 of a type more fully described in U.S. Pat. No. 3,650,765, the disclosure of which is incorporated herein by reference and relied upon. In the aforesaid patent, the apparatus is employed to form onion rings from an extrudable slurry with the slurry being delivered to a cylindrical nozzle 14. The flow to the nozzle 14 may be by gravity by a fluid under pressure or other suitable means. The nozzle 14 cooperates with the food forming sleeve 16 which delivers a formed product 18 to a bath 20 in which may be installed belt conveyor 22 for transporting the formed article to a subsequent processing station.

The forming sleeve 16 is provided adjacent its upper end with an annular groove 24 in which is located the end of a forked displacement arm 26. The opposite end of the arm 26 is pivotable by a solenoid operated linkage 30 to rapidly shift the sleeve 16 up and down in the direction of the arrows A. The timing sequence for the movement of the sleeve 16 and the control valve, described below, will be synchronized.

Figure 2:
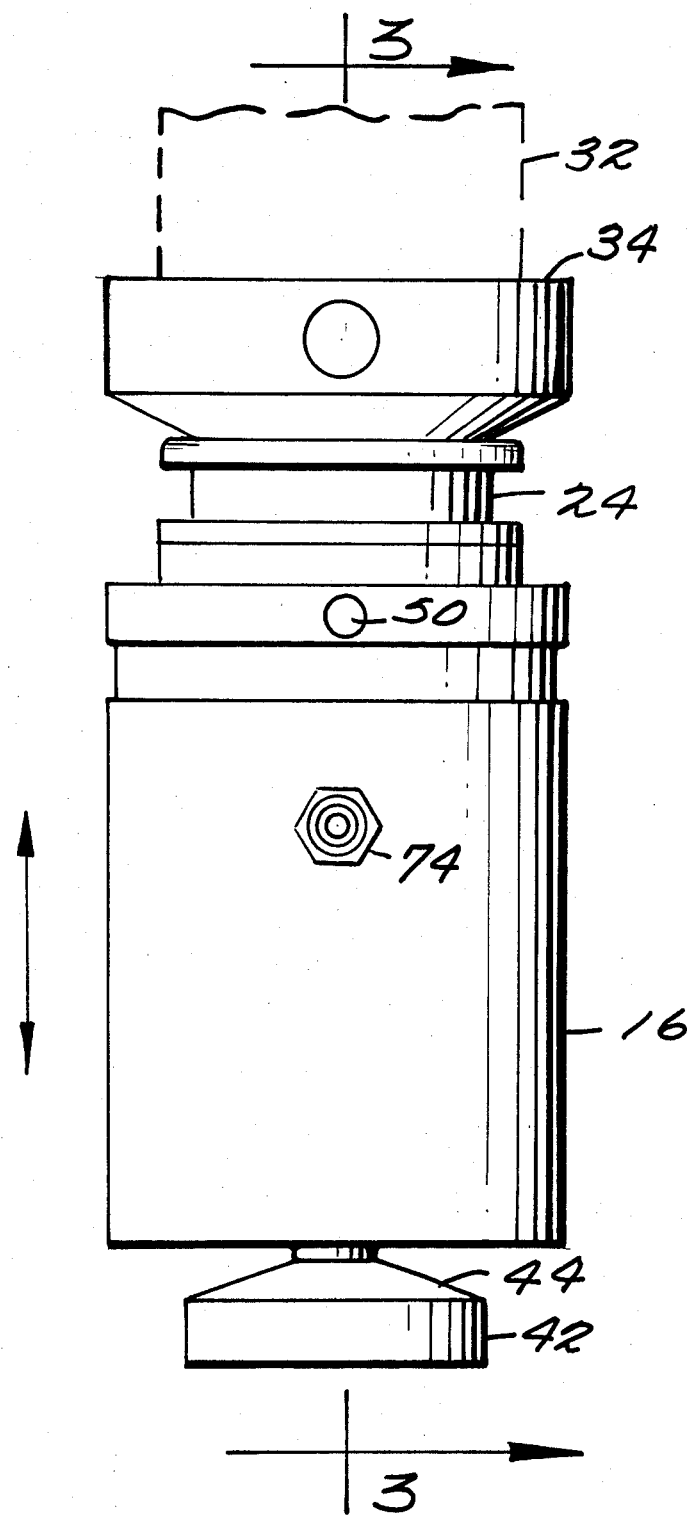
FIG. 2 is an enlarged side view in elevation of the device of the present invention.
Figure 3:
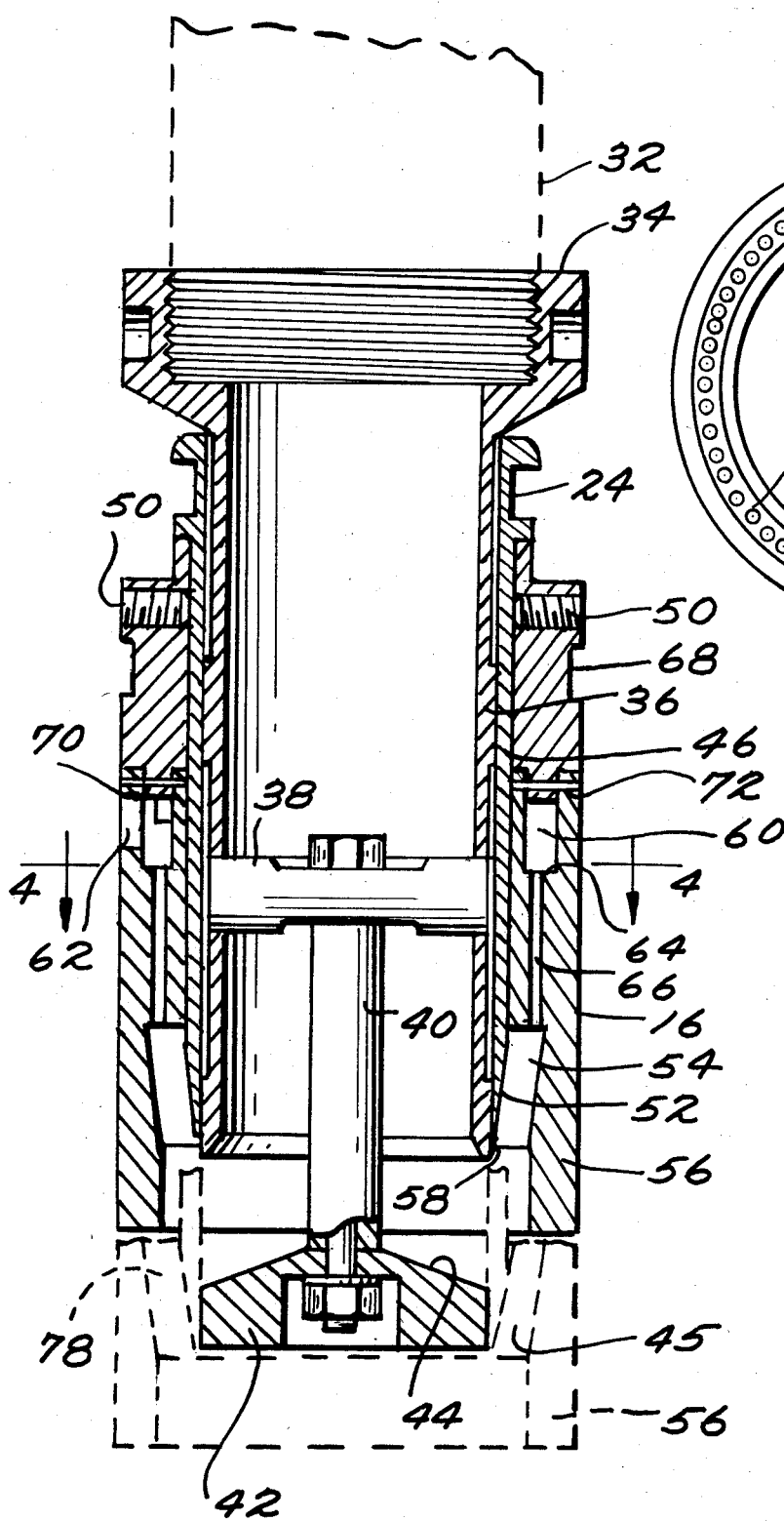
FIG. 3 is a view along lines 3—3 of FIG. 2.

Turning now to FIGS. 2 and 3, there are shown enlarged views of the device of the present invention with the upper end 34 attached to a schematically indicated feed tube 32.

The feeder tube 32, connected to feeder 12, will supply a slurry of food product to the upper end 34 of nozzle 14, which is in generally cylindrical form and particularly adapted to form oval or circular rings for the manufacture of doughnuts, onion rings or the like. This is achieved by connecting to a cross rod 38, the ends of which are permanently mounted across a diameter of the nozzle 14, a support rod 40 lying along the axis of the nozzle 14 and a circular member 42 which is bolted to the lower end of the rod 40, as illustrated. The side of the circular member 42 facing the nozzle is in the form of a frustoconical surface 44 whereby the outward slant of the surface 44 relative to the direction of flow of the slurry down through nozzle 14 will assist dispensing to the annular forming space 45 for the food product. The annular forming space 45 is defined by a cylindrical sleeve member 46 and the outer sleeve 16 which is carried on the sleeve 46 and held in position by threaded pins such as indicated at 50.

Figure 4:
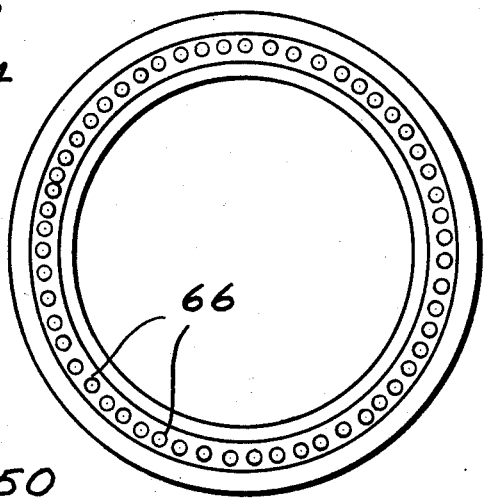
FIG. 4 is a view along lines 4—4 of FIG. 3.

The lower end of the sleeve 46 is exteriorly tapered as at 52. The inner face of sleeve 16 is provided with a recess 54 adjacent the taper 52 and includes a cylindrical section 56 which extends below the lower edge 58 of the inner sleeve 46. Adjacent the mid-section of the outer sleeve 16 an annular cavity 60 is formed which is connected to a fluid inlet 62. The annular cavity 60 has a bottom wall 64 in which are formed a plurality of bores 66 which extend about the circumference of the annular cavity 60 and which communicate with the recess 54. A large number of such bores 66 may be provided as indicated in FIG. 4 to assure adequate distribution of fluid fed from the inlet 62 to the chamber 60 and from the chamber 60 to the recess 54.

To facilitate manufacture of the outer sleeve 16, the upper end thereof may be provided as a separate element whereby an appropriate mold may be used to form the cavity 60. Thereafter, the upper element 68, which is formed with a ring 70 is insertable into a portion of the cavity 60. Thereafter, metal pins 72 may be employed, as illustrated, to secure the upper elements 68 on the upper end of the sleeve 16.

The opening 62, in sleeve 16 may be provided with a plug member 74 as shown in FIG. 2 to facilitate connection as by a hose 76 (FIG. 1) to a source of fluid under pressure.

In operation, with the inner and outer sleeves 46 and 16 in the raised position of FIG. 3, slurry which is continually under pressure is continuously delivered to sleeve 16 at 34 and flows from the bottom of the nozzle 16. The slurry begins to flow outwardly between the circular member 42 and the lower edge of the annular wall segment 56. The solenoid 28 is then activated to lower the inner and outer sleeves 46 and 16 whereby the lower end 58 will immediately commence cutting off the outward flow of the slurry until the lower end 58 reaches the upper edge of the surface 44. At this time, a quantity of food product, schematically indicated at 78, is trapped in the cavity 54 and between the surface 52 of the sleeve 46 and the inner wall of the lower end 56 of the sleeve 16. At this juncture, an automatic control valve, not shown, operates to deliver a suitable fluid under pressure through opening 62 to chamber 60 and through the bores 66 to facilitate discharging the formed product and then any remaining plugged food slurry in recess 54 whereby the food product 78 will be dispensed under positive pressure to the bath 20 immediately below the device. Upon expulsion of the food product ring 78 from the lower end of the device when using an automatic control valve, a pressure drop will exist in chamber 60 which can be detected by conventional pressure sensitive means to stop the delivery of fluid under pressure to the inlet 62.

It has been found, that in the operation of food forming apparatus, that significantly greater production capacities can be achieved where the formed food product is discharged under positive pressure from the food forming device as provided by the present invention. Clogging of the apparatus is eliminated.

Having described the invention, it will be apparent to those skilled in this art that various modifications may be made thereto without departing from the spirit and scope of this invention as defined in the appended claims.

What is claimed is:

1. A device for forming a food product comprising,
a nozzle having a longitudinal axis and a first end for connection to a slurry supply means and a second end, sleeve means disposed about the exterior of said nozzle and having a longitudinal axis, said sleeve means being movable axially relative to said nozzle between a retracted and a forward position, said sleeve means including a forming end disposed radially outwardly of said nozzle and means for delivering fluid under pressure between said forming end of said sleeve means and said nozzle to assist in discharging the slurry from said sleeve means,
said sleeve means including a severing end disposed radially inwardly of said forming end, said sleeve means housing an annular channel located between severing end and said forming end, said sleeve means further including a fluid distribution chamber extending entirely around said sleeve means, said distribution chamber being in flow communication with said annular channel, said means for delivering fluid under pressure being connected to said distribution chamber, said distribution chamber being annular in shape and said flow communication with said annular channel having a large number of closely spaced elongated bores formed in said sleeve means with said bores being substantially evenly spaced about the sleeve means and extending substantially parallel to said axis of said sleeve means.

2. The device as claimed in claim 1 wherein said forming end of said sleeve means extends beyond said severing end a predetermined extent and said annular channel is open in axial direction facing toward said forming end.

3. The device as claimed in claim 1 wherein said means for delivering fluid under pressure includes a fluid inlet connected to said sleeve means.

4. The device as claimed in claim 1. wherein said means for delivering fluid includes an air inlet.

5. The device as claimed in claim 3 wherein said fluid is a gas.

6. The device as claimed in claim 3 wherein said fluid is a liquid.

* * * * *